United States Patent [19]
Tsujimoto et al.

[11] Patent Number: 5,597,867
[45] Date of Patent: Jan. 28, 1997

[54] THERMOPLASTIC ELASTOMER COMPOSITION

[75] Inventors: Motoyoshi Tsujimoto, Akashi; Sumiya Miyake, Yokohama, both of Japan

[73] Assignee: Sumitomo Bakelite Company Limited, Tokyo, Japan

[21] Appl. No.: 570,188

[22] Filed: Dec. 11, 1995

Related U.S. Application Data

[62] Division of Ser. No. 326,207, Oct. 20, 1994, abandoned.

[30] Foreign Application Priority Data

| Oct. 21, 1993 | [JP] | Japan | 5-263910 |
| Dec. 1, 1993 | [JP] | Japan | 5-301795 |
| Dec. 1, 1993 | [JP] | Japan | 5-301796 |

[51] Int. Cl.$^6$ .................. C08L 21/00; C08L 23/16; C08L 23/22
[52] U.S. Cl. .................. 525/74; 525/926; 525/100; 525/101; 525/103; 525/105; 525/106; 524/504; 524/505; 524/506; 523/435; 523/436; 523/437; 523/438
[58] Field of Search .................. 525/74, 100, 92 G, 525/99, 105, 106, 101; 524/504, 505, 506; 523/435, 436, 437, 438

[56] References Cited

U.S. PATENT DOCUMENTS

| 4,107,130 | 8/1978 | Gerge et al. | 525/95 |
| 4,594,390 | 6/1986 | Abdou-Sabet et al. | |
| 4,803,244 | 2/1989 | Umpleby. | |
| 5,420,201 | 5/1995 | Abe et al. | 525/74 |
| 5,484,824 | 1/1996 | Abe et al. | 523/436 |

FOREIGN PATENT DOCUMENTS

| 0435173 | 7/1991 | European Pat. Off. . |
| 53-21021 | 6/1978 | Japan . |
| 58-46138 | 10/1983 | Japan . |
| 61-34050 | 2/1986 | Japan . |

*Primary Examiner*—Ralph H. Dean
*Attorney, Agent, or Firm*—Browdy and Neimark

[57] ABSTRACT

This invention provides a novel thermoplastic elastomer composition which is rich in flexibility and excellent in rubber elasticity over a broad temperature range, high-temperature creep characteristics, low-temperature impact resistance, mechanical strength and moldability, and have good oil resistance, good light discoloration resistance and extremely excellent toning properties in spite of thermoplastic elastomer and which is characterized by being obtained by dynamically heat-treating a mixture of (a) 100 parts by weight of a carbon-to-carbon double bond-containing rubber, (b) 5 to 300 parts by weight of a thermoplastic resin, (c) 0.5 to 30 parts by weight of an organosiloxane crosslinking agent having at least two SiH groups in the molecule, (d) 0.001 to 20 parts by weight of a hydrosilylating catalyst, (e) 0.5 to 20 parts by weight of a compatibilizing agent and, if necessary, (f) 30 to 300 parts by weight of a paraffinic oil. The present thermoplastic elastomer composition can be used as a material for various molded products.

10 Claims, No Drawings

THERMOPLASTIC ELASTOMER COMPOSITION

This application is a division of application Ser. No. 08/326,207, filed Oct. 20, 1994, now abandoned.

BACKGROUND OF THE INVENTION

This invention relates to a thermoplastic elastomer composition. More particularly, this invention relates to a novel thermoplastic elastomer composition which is rich in flexibility and excellent in rubber elasticity over a broad temperature range, high-temperature creep characteristics, low-temperature impact resistance, mechanical strength and moldability, have good oil resistance, good light discoloration resistance and extremely excellent toning properties in spite of thermoplastic elastomer, and can be used as a material for various moldings.

Thermoplastic elastomers which are rubbery soft materials, which do not require curing step and which have the same moldability as thermoplastic resins, have recently been utilized in the fields of automobile parts, domestic appliance parts, wire-coating materials, medical parts, miscellaneous goods, footwear and the like.

Typical examples of the structure of a thermoplastic elastomer includes a type in which a hard segment and a soft segment are alternately present in a copolymer chain as disclosed in Japanese Patent Application Kokai No. 61-34,050 or the like. By varying the proportion of each segment, thermoplastic elastomers of various grades from flexible to rigid have been produced.

Moreover, there are different kinds of thermoplastic elastomers derived from inexpensive and easily available materials. That is to say, as disclosed in Japanese Patent Application Kokoku No. 53-21,021 or the like, a thermoplastic blend of a monoolefin copolymer rubber partially crosslinked with an organic peroxide and a polyolefin resin, and a partially crosslinked composition obtained by melt-kneading a monoolefin copolymer rubber and a polyolefin resin using an organic peroxide as a crosslinking coagent, correspond to the above different kinds of thermoplastic elastomers.

However, in the case of the former thermoplastic elastomer having such a structure that a hard segment and a soft segment are alternately present in the copolymer chain, it is necessary for the copolymer to contain a large amount of the soft segment for obtaining a flexible thermoplastic elastomer. Usually, the soft segment is low in tensile strength and inferior in heat resistance, flow properties and oil resistance, and hence, the flexible thermoplastic elastomer containing a large amount of such a soft segment is also low in tensile strength and inferior in heat resistance, flow properties and oil resistance, and therefore, cannot be applied to various uses over a broad range.

When thermoplastic elastomers of various flexibility grades are intended to be synthesized by a multistage synthesis process, it is necessary to separately synthesize the soft segment and the hard segment, so that the polymerization apparatus becomes very complicated and also it is very difficult to control the properties and proportion of each segment in the polymerization stage. Moreover, in some cases, many defective products are produced at the time of change of the grade. Furthermore, the recovery of the polymer produced is very difficult because a large amount of rubbery material is contained in the polymer.

In the case of the latter thermoplastic elastomer composition having such a structure that a partial crosslinking has been imparted to a monoolefin copolymer rubber which is one of the constituents, the oil resistance, the shape recovery at high temperatures and the like are insufficient because of the partial cross-linking, so that the thermoplastic elastomer cannot be applied in various uses over a broad range. Also, since an organic peroxide is used, the polymer chain is cut by a radical resulting from the organic peroxide simultaneously with the crosslinking and a reduction of mechanical strength is observed. Japanese Patent Application Kokoku No. 58-46,138 and others disclose a measure for overcoming the above disadvantages. This is such that a heat-reactive alkylphenol resin is used as the cross-linking agent to allow only the crosslinking of the monoolefin copolymer rubber to proceed preferentially. The thermoplastic elastomer obtained by this measure is completely crosslinked, and hence, is sufficient in oil resistance, shape-recovery at high temperatures and the like. However, since the alkylphenol resin is used, the light discoloration resistance is greatly inferior, and hence, the thermoplastic elastomer cannot be applied to uses requiring the freedom of coloration such as automobile parts, domestic appliance parts, wire-coatings and the like.

Moreover, U.S. Pat. No. 4,803,244 proposes using an organosiloxane compound in place of the alkylphenol resin as a cross-linking agent. According to this method, it is possible to allow only the crosslinking of the monoolefin copolymer rubber to proceed preferentially similarly to the crosslinking with an alkylphenol resin, and a material extremely excellent in oil resistance, shape recovery at high temperatures, light discoloration resistance and the like can be obtained, so that the resulting thermoplastic elastomer can be applied to uses such as automobile parts, domestic appliance parts, wire coatings and the like which require freedom of coloration. However, according to this method, no compatibilizing agent is used, and hence, the adhesion between the rubber and the resin is not sufficient, so that the impact resistance at low temperatures cannot be said to be sufficient. Therefore, such a thermoplastic elastomer cannot be applied to uses requiring impact resistance at low temperatures, for example, materials for air bag cover of an automobile. Also, in the case of a usual kneading method, the current situation is that since no compatibilizing agent is used the rubber dispersion is not sufficient and hence the appearance of the extrusion-molded article is remarkably inferior. Therefore, as disclosed in U.S. Pat No. 4,594,390, dynamic heat-treatment under a high shear of 2000/sec or higher has been proposed for solving the above problem. However, according to this method, the material is exposed to high shear though the residence time is short, and therefore, the material per se tends to decompose and deteriorate. Moreover, in order to achieve high shear, it is necessary not only to increase the revolution rate in the melt-kneading but also narrow the clearance of a kneader to about ⅓ to ⅕ of that of a usual kneader. Thus, said method is not practical in the aspect of productivity of a thermoplastic elastomer composition and durability of a kneader.

By the known techniques which have been proposed by now, the essential problem has not been solved, that is, the morphologic change that the rubber dispersed by an annealing treatment is agglomerated again is still caused, and as a result, the current situation is that the thermoplastic elastomer composition cannot be used in the automobile field or the like wherein the long term reliability of quality is required.

SUMMARY OF THE INVENTION

This invention has been made for solving the problem which has been difficult to solve by a conventional thermoplastic elastomer composition.

That is, it is the object of this invention to provide a thermoplastic elastomer composition which can maintain good rubber characteristics over a broad temperature range, which has characteristics of low-temperature impact resistance, wide freedom of coloration, low residual heavy metal content and the like and which can be applied to various uses in a wide range including a use in which toning is required and a use in which hygienic properties and long-term reliability are required.

The present inventors have developed their research based on the technical idea that the selective crosslinking of a rubber is conducted by using, as a crosslinking agent, an organosiloxane compound having at least two SiH groups in the molecule which compound is excellent in light discoloration resistance and applicability to living organisms and has characteristics of selectively crosslinking a rubber, and by crosslinking a rubber while melt-kneading the rubber with a hydrosilylating catalyst, and that the bonding strength at the interface between the rubber and a thermoplastic resin is increased with a compatibilizing agent to highly disperse the crosslinked rubber particles without relying on only mechanical shearing force. As a result, they have found that a thermoplastic elastomer composition which has good rubber characteristics over a broad temperature range and which can be applied to various uses in a wide range including uses which require low-temperature impact resistance, free coloration and good appearance of molded articles can be obtained by a usual kneader under very common sensible melt-kneading conditions that the shear rate is 100 to 1,000/sec. Based on this knowledge, further research have been made to complete this invention. It has also been found that since the thermoplastic elastomer composition produced by this invention has undergone a compatibilizing treatment, a morphological change is difficult to cause even when the thermoplastic elastomer composition is subjected to annealing treatment, and therefore, it is extremely excellent also in long term reliability.

According to this invention, there is provided a thermoplastic elastomer composition obtained by dynamically heat-treating a mixture of (a) a carbon-to-carbon double bond-containing rubber, (b) a thermoplastic resin, (c) an organosiloxane crosslinking agent having at least two SiH groups in the molecule, (d) a hydrosilylating catalyst and (e) a compatibilizing agent, particularly a mixture of (a) 100 parts by weight of a carbon-to-carbon double bond-containing rubber with (b) 5 to 300 parts by weight of a thermoplastic resin, (c) 0.5 to 30 parts by weight of an organosiloxane crosslinking agent having at least SiH groups in the molecule, (d) 0.001 to 20 parts by weight of a hydrosilylating catalyst, (e) 0.5 to 20 parts by weight of a compatibilizing agent and, if necessary, (f) 30 to 300 parts by weight of a paraffinic oil.

The carbon-to-carbon double bond-containing rubber (a) used in this invention is not particularly limited, and includes all generally commercially available rubbers containing carbon-to-carbon double bonds in the main chain and/or side chains. Examples thereof include ethylene-α-olefin-non-conjugated diene copolymer rubbers; polybutadiene; polyisoprene; natural rubber; styrene-butadiene random copolymer rubber; styrene-isoprene random copolymer rubber; styrene-butadiene block copolymer rubber; styrene-isoprene block copolymer rubber; α,β-unsaturated nitrile-butadiene copolymer rubber such as acrylonitrile-butadiene copolymer rubber which is most often used as the α,β-unsaturated nitrile-conjugated diene copolymer rubber; and the like. There may also be used partially hydrogenated rubbers prepared by partially hydrogenating the aliphatic double bonds contained in these rubbers to reduce the unsaturation degree. For example, partially hydrogenated rubbers having a hydrogenation degree of less than 80% may be used. These rubbers may be used alone or even in the form of a blend of two or more.

In the case of ethylene-α-olefin-non-conjugated diene copolymer rubber consisting of ethylene, α-olefin and non-conjugated diene, the α-olefin is suitably one having 3 to 15 carbon atoms, and as the non-conjugated diene, there may be used dicyclopentadiene, 1,4-hexadiene, ethylidenenorbornene, methylenenorbornene and the like. In this invention, as the α-olefin, propylene is suitable in view of easy availability and improvement in impact resistance. That is, EPDM is preferable. In the ethylene-α-olefin-non-conjugated diene copolymer rubber, the ethylene/α-olefin weight ratio is preferably 50/50 to 90/10, more preferably 60/40 to 80/20. The Mooney viscosity $ML_{1+4}(100°\ C.)$ of the rubber used can be selected from the range of 10 to 120, preferably 40 to 100. When a rubber having a Mooney viscosity of less than 10 is used, neither preferable crosslinking is obtained nor improvement in compression set at high temperatures can be expected, so that said Mooney viscosity is not desirable. Also, when a rubber having a Mooney viscosity of more than 120 is used, the moldability is extremely deteriorated and the appearance of the resultant molded article is inferior, so that such Mooney viscosity is also undesirable. The iodine value of this rubber is preferably 5 to 30, particularly preferably 10 to 20.

The thermoplastic resin (b) used in this invention is effective for enhancing the processability and heat resistance of the composition obtained.

Here, it is necessary that the thermoplastic resin be relatively inert to hydrosilylation in the crosslinking reaction of the rubber. Specific examples thereof include crystalline or non-crystalline polyolefin resins; polystyrene resins such as ABS and polystyrene; vinyl chloride resins; polyamide resins; polyester resins; polycarbonate resins; polyacetal resins; polyphenylene ether resins; and the like. These resins may be used in combination of two or more. The crystalline olefin resin includes, for example, polyethylene, isotactic polypropylene, random and/or block copolymers of propylene and a small amount of another α-olefin, specifically propylene-ethylene copolymer, propylene-1-hexene copolymer, and propylene-4-methyl-1 pentene copolymer and poly-4-methyl-1-pentene, polybutene and the like. When as the crystalline olefin resin, isotactic polypropylene or its copolymer is used, those having an MFR (ASTM-D-1238L, condition: 230° C.) falling within the range of 0.1 to 50 g/10 minutes, particularly preferably 0.5 to 30 g/10 minutes can be used.

The non-crystalline olefin resin is a homopolymer having a cyclic olefin structure or a copolymer of a cyclic olefin and an α-olefin.

When a crystalline olefin resin or a vinyl chloride resin is used, the processability becomes particularly good and when a polyamide resin or a polyester resin is used, the heat resistance becomes good.

The amount of the thermoplastic resin (b) blended is preferably 5 to 300 parts by weight, more preferably 10 to 200 parts by weight, per 100 parts by weight of the rubber component (a). When the amount exceeds 300 parts by weight, the hardness of the resulting elastomeric composition tends to become high and the flexibility tends to be lost, and when the amount is less than 5 parts by weight, the processability tends to become low.

The crosslinking agent (c) for the rubber used in this invention is an organosiloxane compound having at least two SiH groups. This crosslinking method utilizes the selective addition reaction (hydrosilylation) of the SiH group to the unsaturated hydrocarbon in the rubber component. Since it is a necessary condition that the compound add to at least two molecules of the rubber in order for the compound to act as a crosslinking agent, it is necessary for the compound to have at least two SiH groups in the molecule.

Typical specific examples of such a compound are cyclic polysiloxanes, linear polysiloxanes and compounds having a tetrahedron siloxane structure as shown below, and compounds and/or polymers derived from these compounds may be used.

[Cyclic polysiloxane]

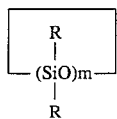

[Tetrahedron siloxane]

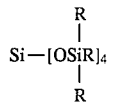

[Linear polysiloxane]

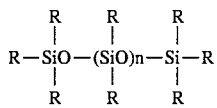

wherein m is an integer of 3 to 30; n is an integer of 0 to 200; R is a hydrogen atom, an alkyl group, an alkoxy group, an aryl group or an aryloxy group; and at least two silicon atoms each having bonded thereto at least one R being a hydrogen atom are present in the molecule.

An organosiloxane having such a structure as mentioned above can selectively crosslink the rubber.

The crosslinking catalyst (d) used in this invention includes all catalysts capable of accelerating the hydrosilylation reaction. Examples of the catalyst include transition metals of Group VIII such as palladium, rhodium, platinum and the like; and compounds and complexes of the metals. Also, peroxides, amines and phosphines may be used. Moreover, ultraviolet rays and γ rays can be used. As the most general catalysts, famous are dichlorobis(acetonitrile)palladium (II), chlorotris(triphenylphosphine)rhodium (I), chloroplatinic acid and the like.

As the crosslinking catalyst (d) used in this invention, organic peroxide catalysts can be preferably used. Examples of the organic peroxide include 2,5-dimethyl-2,5-di(t-butylperoxy)hexane, 2,5-dimethyl-2,5-di(t-butylperoxy)hexine-3, 1,3-bis(t-butylperoxyisopropyl)benzene, 1,1-di(t-butylperoxy)-3,5,5-trimethylcyclohexane, 2,5-dimethyl-2,5-di(peroxybenzoyl)hexine-3, dicumyl peroxide and the like.

A system in which an organic peroxide is used in combination with a bismaleimide compound as a cocatalyst may be used as the catalyst. The bismaleimide compound used in this invention includes N,N'-m-phenylene bismaleimide, toluylene bismaleimide and the like. As the N,N'-m-phenylene bismaleimide, there can be used, for example, commercially available HVA-2 (manufactured by Du Pont), Soxinol BM (manufactured by Sumitomo Chemical Co., Ltd.) and the like.

The use of the peroxide catalyst enables the thermoplastic elastomer composition obtained in this invention to be suitably used even for uses in which the residual heavy metal becomes a problem, for example, the medical field.

In order to more highly disperse the catalyst, the hydrosilylating catalyst (d) can be dissolved in at least one liquid component or supported on at least one solid component. That is, a measure for dissolving in a solvent, supporting on an inorganic filler or a combination of the two can be used. The solvent used therein is not particularly limited; however, it is necessary for the solvent to be relatively inert to the hydrosilylating reaction. Examples of the solvent include hydrocarbon solvents, alcohol solvents, ketone solvents, ester solvents and the like. The concentration of the solution to be prepared is not particularly limited. The inorganic filler is required to have an adsorbability, and includes calcium carbonate, carbon black, talc, magnesium hydroxide, mica, barium sulfate, natural silicic acid, synthetic silicic acid (white carbon), titanium oxide and the like. The method of preparing the catalyst supported on a carrier may be any known method.

The dynamically treated, namely dynamically vulcanized thermoplastic elastomer composition is so vulcanized a composition that the gel content indicated by the value 100 times the ratio of the dry weight of the insolubles remaining on a mesh to the weight of the component (a) contained in 1 g of the composition, said insolubles having been obtained by refluxing 1 g of the composition obtained in this invention for 10 hours in a Soxhlet extractor using boiling xylene and filtering the residue obtained through an 80-mesh wire mesh, becomes at least 30%, preferably at least 50% (provided that the insolubles do not include the inorganic filler and the like), and is characterized in that said vulcanization is effected during the melt-kneading of the thermoplastic elastomer composition.

In order to obtain said dynamically vulcanized thermoplastic elastomer composition, the amount of the organosiloxane crosslinking agent (c) added can be preferably selected from the range of 0.5 to 30 parts by weight, more preferably 1 to 20 parts by weight, per 100 parts by weight of the component (a), whereby the gel content can be controlled. The catalyst (d) may be added in any amount within the range of 0.001 to 20 parts by weight per 100 parts by weight of the rubber component. When the catalyst is a heavy metal catalyst the amount thereof is preferably 0.005 to 5 parts by weight, more preferably 0.01 to 2 parts by weight. Also, when the catalyst is a peroxide catalyst, the amount thereof is preferably 0.01 to 15 parts by weight, more preferably 0.1 to 10 parts by weight. When the amount is less than 0.001 part by weight in the above case, the crosslinking does not proceed at a practical speed. When the amount exceeds 20 parts by weight, no effect of the increased amount is obtained, the deactivated catalyst remains in the form of black granular structure to deteriorate the appearance, and heat treatment tends to cause undesirable side reactions (decomposition of unreacted SiH group and the like).

The compatibilizing agent (e) used in this invention contains a component having an affinity to the rubber and a component having an affinity to the thermoplastic resin in one and the same molecule and hence acts like a surface active agent, whereby the rubber vulcanized under the usual kneading conditions (shear rate: 100–1,000/sec) is dispersed in the form of fine particles having a size of 30 microns or less, the bonding strength at the interface between the vulcanized rubber and the thermoplastic resin is enhanced and the low-temperature impact resistance is remarkably improved. As far as the above purpose is met, the structure of monomer, oligomer and polymer as the compatibilizing agent is not particularly limited. As the general structure of the compatibilizing agent (e), it is necessary that the compatibilizing agent has a component molecularly compatible with the rubber (a) and a component molecularly compatible with the thermoplastic resin (b) in the same molecule; however, for a combination of a usual resin with a usual rubber, in the case of polymers of single monomers, only a few thereof can have an affinity to both the resin and the rubber which are different in their molecular structures. Accordingly, in general, the compatibilizing agent is preferably a block copolymer, a random copolymer or a graft copolymer in which at least two monomers are polymerized. Such copolymers may be commercially available ones or may be prepared as desired.

A styrene copolymer is an example of the commercially available copolymer used as a compatibilizing agent for a combination of a hydrocarbon rubber such as ethylene-propylene-diene terpolymer (EPDM), butyl rubber and the like with a thermoplastic resin, particularly a polystyrene resin, a polycarbonate resin, a polyphenylene ether resin, a polyolefin resin or the like. The styrene copolymer includes styrene-butadiene copolymers (including all of random copolymer, block copolymer, graft copolymer, etc.) and their hydrogenated products. More specifically, there are mentioned styrene-butadiene-styrene copolymer (SBS), hydrogenated styrene-butadiene styrene copolymer (SEBS), isoprene-styrene copolymer, hydrogenated isoprene-styrene copolymer (SEP), styrene-isoprene-styrene copolymer (SIS), hydrogenated styrene-isoprene-styrene copolymer (SEPS) and the like. Among them, SEBS, SEP and SEPS are styrene elastomers which are preferably used to markedly improve the low-temperature impact resistance. The styrene content is preferably 10 to 80% by weight, more preferably 30 to 70% by weight, and most preferably 40 to 70% by weight.

Some kinds of typical structures of the compatibilizing agent are mentioned below, and combinations of the carbon-to-carbon double bond-containing rubber (a) with the thermoplastic resin (b) on which combination each of the compatibilizing agents exhibits sufficiently its effect, are also shown below.

When the compatibilizing agent (e) is at least one compatibilizing agent selected from the following compatibilizing agents (e-1) and (e-2), it is preferably applied to a combination of at least one member selected from the group consisting of ethylene-α-olefin-non-conjugated diene copolymer rubber, vinyl aromatic compound-conjugated diene compound copolymer rubber, butadiene rubber and butyl rubber as the carbon-carbon double bond-containing rubber (a) with at least one member selected from the group consisting of polyolefin resin, polystyrene resin, styrene copolymer and polyphenylene ether resin as the thermoplastic resin (b):

(e-1): a hydrogenated block copolymer obtained by hydrogenating a copolymer comprising at least two terminal blocks each consisting mainly of a vinyl aromatic compound and at least one intermediate polymer block consisting mainly of a conjugated diene compound and (e-2): an ethylene-α-olefin copolymer.

The above-mentioned combinations of the carbon-to-carbon double bond-containing rubber (a) with the thermoplastic resin have relatively good compatibility. However, the use of a compatibilizing agent in which the block components have good affinity to both the rubber and the thermoplastic resin as in (e-1) enables the production of a highly functional thermoplastic elastomer composition. The compatibilizing agent (e-2) exhibits an improving effect particularly on poor fluidity and bad dispersion caused during the melt-kneading of the carbon-to-carbon-double bond-containing rubber (a) and the thermoplastic resin (b) because of their large molecular weights though the component (a) and the component (b) are inherently good in compatibility with each other.

When the compatibilizing agent (e) is at least one member selected from the following epoxy-modified compatibilizing agents (e-3), (e-4) and (e-5), it is preferably applied to a combination of at least one member selected from the group consisting of ethylene-α-olefin-non-conjugated diene copolymer rubber, vinyl aromatic compound-conjugated diene copolymer rubber, butadiene rubber and butyl rubber as the carbon-to-carbon double bond-containing rubber (a) with at least one member selected from polyolefin resin, polyester resin, polyamide resin and polycarbonate resin as the thermoplastic resin (b):

(e-3): an epoxy-modified block copolymer obtained by hydrogenating a copolymer comprising at least two terminal blocks each consisting mainly of a vinyl aromatic compound and at least one intermediate polymer block consisting mainly of a conjugated diene compound, (e-4): an epoxy-modified ethylene-α-olefin(-non-conjugated diene) copolymer rubber, and (e-5): an epoxy-modified polyolefin resin.

In this combination, the thermoplastic resin except a polyolefin resin has a group capable of reacting with the epoxy group, and by reacting said group with the epoxy group, a graft copolymer having an affinity to each of the carbon-to-carbon double bond-containing rubber (a) and the thermoplastic resin (b) is formed. This graft copolymer enables the vulcanized rubber to be highly dispersed in the thermoplastic resin. Even when the thermoplastic resin is a polyolefin resin, the vulcanized rubber can be highly dispersed in the thermoplastic resin because the compatibilizing agent per se has an affinity to the two.

When the compatibilizing agent (e) is at least one member selected from the following maleic anhydride-modified compatibilizing agents (e-6), (e-7) and (e-8), it can be preferably applied to a combination of at least one member selected from the group consisting of ethylene-α-olefin-non-conjugated diene copolymer rubber, vinyl aromatic compound-conjugated diene copolymer rubber, butadiene rubber and butyl rubber as the carbon-to-carbon double bond-containing rubber (a) with at least one member selected from the group consisting of polyolefin resin and polyamide resin as the thermoplastic resin (b):

(e-6): a maleic anhydride-modified hydrogenated block copolymer obtained by hydrogenating a copolymer comprising at least two terminal blocks consisting mainly of a vinyl aromatic compound and at least one intermediate polymer block consisting mainly of a conjugated diene compound, (e-7): a maleic anhydride-modified ethylene-α-olefin(-non-conjugated diene) copolymer rubber, and (e-8): a maleic anhydride-modified polyolefin resin.

In this combination, the thermoplastic resin except a polyolefin resin has a group capable of reacting with maleic anhydride group, and by reacting said group with the maleic anhydride group, a graft copolymer having an affinity to each of the carbon-to-carbon double bond-containing rubber (a) and the thermoplastic resin (b) is formed. This graft copolymer enables the vulcanized rubber to be highly dispersed in the thermoplastic resin. Even when the thermoplastic resin is a polyolefin resin, since the compatibilizing agent per se has an affinity, the vulcanized rubber can be highly dispersed in the thermoplastic resin. This compatibilizing agent is particularly preferably used when the thermoplastic resin is a polyamide resin.

Moreover, when the compatibilizing agent is (e-9) a modified polyolefin resin having epoxy group and ester group in the same molecule, it is preferably applied to a combination of at least one member selected from the group consisting of ethylene-α-olefin-non-conjugated diene copolymer rubber, vinyl aromatic compound-conjugated diene compound copolymer rubber, butadiene rubber, butyl rubber, α,β-unsaturated nitrile-conjugated diene copolymer rubber and acrylic rubber as the carbon-to-carbon double bond-containing rubber (a) with at least one member selected from the group consisting of polyolefin resin, polyester resin, polyamide resin, polycarbonate resin, vinyl chloride resin and methacrylate resin as the thermoplastic resin (b).

Since the compatibilizing agent is a modified polyolefin resin having epoxy group and ester group in the same molecule, thermoplastic resins which can react or are compatible with the compatibilizing agent are in a broad range, and the graft copolymer produced has an improving effect on the above-mentioned combination of the carbon-to-carbon double bond-containing rubber (a) with the thermoplastic resin (b).

Also, when the compatibilizing agent is (e-10) at least one member selected from the group consisting of halogenated polyolefin resin, vinyl chloride-vinyl acetate copolymer and vinyl aromatic compound-α,β-unsaturated nitrile-conjugated diene copolymer, it can preferably be applied to a combination of at least one member selected from the group consisting of acrylic rubber and α,β-unsaturated nitrile-conjugated diene copolymer rubber as the carbon-to-carbon double bond-containing rubber (a) with at least one member selected from the group consisting of vinyl chloride resin, polyurethane resin and methacrylate resin as the thermoplastic resin (b).

Furthermore, examples of compatibilizing agent for a combination of, for example, a hydrocarbon rubber with a polyolefin resin among the thermoplastic resins include the following compatibilizing agents (e-11), (e-12) and (e-13):

(e-11): a compatibilizing agent prepared by melt-reacting an epoxy group-containing polypropylene resin as an essential component with at least one member selected from carboxylic acid-modified resins such as polyethylene having carboxylic anhydride group and/or carboxyl group in the molecule, ethylene copolymer having carboxylic anhydride group and/or carboxyl group in the molecule, styrene block copolymer having carboxylic anhydride group and/or carboxyl group in the molecule, its hydrogenated product, styrene random copolymer having carboxylic anhydride group and/or carboxyl group in the molecule and its hydrogenated product and the like, (e-12): a compatibilizing agent prepared by melt-reacting a maleic anhydride group-containing polypropylene resin as an essential component with at least one member selected from epoxy-modified resins such as epoxy group-containing polyethylene, epoxy group-containing ethylene copolymer, epoxy group-containing styrene block copolymer, its hydrogenated product, epoxy group-containing styrene random copolymer, its hydrogenated product and the like, and (e-13): a compatibilizing agent prepared by dynamically heat-treating, in the presence of a peroxide, a blend of a polypropylene as an essential component with at least one resin selected from the group consisting of polyethylene, ethylene copolymer, styrene block copolymer, its hydrogenated product, styrene random copolymer and its hydrogenated product.

The modified resin having maleic anhydride group and the modified resin having epoxy group which are used as the starting materials for the compatibilizing agents (e-11) and (e-12) can be easily obtained by any known technique. That is, they are obtained by graft-copolymerization using a peroxide or the like or copolymerizing the resin monomer components. These may also be commercially available ones.

The modified resin having maleic anhydride group in the molecule used in this invention includes ethylene-acrylic acid-maleic anhydride terpolymer, ethylene-ethyl acrylate-maleic anhydride terpolymer, ethylene-methacrylic acid-maleic anhydride terpolymer, maleic anhydride-grafted polypropylene, maleic anhydride-grafted polyethylene, maleic anhydride-grafted ethylene-propylene copolymer, maleic anhydride-grafted styrene-ethylene-butylene-styrene block copolymer, maleic anhydride-grafted styrene-ethylene-butylene-styrene random copolymer and the like.

The modified resin having epoxy group used in this invention includes ethylene-glycidyl methacrylate copolymer, ethylene-acrylic acid-glycidyl acrylate terpolymer, ethylene-acrylate-allyl glycidyl ether terpolymer, ethylene-methacrylate-glycidyl acrylate terpolymer, ethylene-propylene-glycidyl methacrylate terpolymer, glycidyl methacrylate-grafted polypropylene, glycidyl methacrylate-grafted styrene-ethylene-butylene-styrene block copolymer, glycidyl methacrylate-grafted styrene-ethylene-butylene-styrene random copolymer and the like.

The compatibilizing agents (e-11) and (e-12) used in this invention are obtained by subjecting to melt-reaction a composition consisting of the above-mentioned modified resin having maleic anhydride group in the molecule and the above-mentioned modified resin having epoxy group in the molecule with a batchwise kneading machine at 150° to 250° C. for 5 to 30 minutes. Since a remarkable torque rise is caused during the melt-kneading, it is considered that some reactions have been caused between the modified resin having maleic anhydride group in the molecule and the modified resin having epoxy group in the molecule. Furthermore, since in the infrared absorption spectra of the compatibilizing agents (e-11) and (e-12), the characteristic absorptions of the epoxy group and maleic anhydride group contained in the starting materials have disappeared, it is considered that some reactions have been caused between the epoxy group and the acid anhydride group.

The compatibilizing agent (e-13) is obtained by subjecting to melt-reaction a blend of polypropylene as an essential component with at least one resin selected from the group consisting of polyethylene, ethylene-propylene copolymer rubber, styrene block copolymer, its hydrogenated product, styrene random copolymer and its hydrogenated product and an organic peroxide such as organic perester, and if necessary, a cocatalyst such as bismaleimide compound in a batchwise kneading machine at 150°–250° C. for 5 to 30 minutes to co-crosslink the blend. The amount of the organic peroxide catalyst added is preferably 0.0001 to 2 parts by weight per 100 parts by weight of the blend. When the amount of the organic peroxide is less than 0.0001 part by weight, the reaction does not proceed at a practical speed. When the amount is more than 2 parts by weight, no effect of increased amount is obtained and undesirable side reactions (decomposition of polypropylene, gelation reaction and the like) are rather caused.

In the case of the compatibilizing agent (e-11) or (e-12), the modified resin having epoxy group and the modified resin having maleic anhydride group are blended at a weight ratio of the former to the latter of preferably 10:90 to 90:10, more preferably 70:30 to 30:70 and most preferably 60:40 to 40:60, and in the case of the compatibilizing agent (e-13), the polypropylene and the at least one resin selected from the specified group are blended at a weight ratio of the former to the latter of preferably 10:90 to 90:10, more preferably 70:30 to 30:70 and most preferably 60:40 to 40:60. When the proportion of any one of the components is less than 10% by weight, the improving effect on the bonding strength at the interface becomes insufficient, and the improving effect on the low-temperature impact resistance of the thermoplastic elastomer composition of this invention becomes insufficient. The compatibilizing agents (e-11), (e-12) and (e-13) mentioned above are particularly effective when the thermoplastic resin is an olefin resin or the rubber is a hydrocarbon rubber such as EPDM or butyl rubber.

The compatibilizing agent (e) is blended in an amount of 0.5 to 20 parts by weight, preferably 1 to 15 parts by weight, more preferably 2 to 10 parts by weight, per 100 parts by weight of the rubber component (a). When the amount is less than 0.5 part by weight, the effect on reducing the interfacial tension is lowered, and hence, the improving effect on the bonding strength at the interface is reduced, and the dispersed particles of vulcanized rubber tend to become large. Accordingly, the improving effect on the low-temperature impact resistance of the thermoplastic elastomer composition of this invention becomes insufficient and the appearance of the molded article tends to becomes inferior. Also, when the above amount exceeds 20 parts by weight, the hardness of the thermoplastic elastomer composition of this invention becomes high, the low-temperature impact resistance thereof tend to become inferior and no rubbery elasticity as elastomer tends to be exhibited.

The paraffinic oil (f) used in this invention has an action to control the hardness of the composition obtained and give a flexibility thereto, and is added if necessary. Generally, a mineral oil type rubber-softening agent called as a process oil or extender oil for softening a rubber, increasing the volume and enhancing the processability is a mixture in which an aromatic ring, a naphthene ring and a paraffin chain are combined, and those in which the number of carbon atoms of the paraffin chain is 50% or more of the number of the total carbon atoms are called as paraffinic, those in which the number of carbons atoms of the naphthene ring is 30 to 45% of the number of the total carbon atoms is called as naphthenic, and those in which the number of carbon atoms of the aromatic ring exceeds 30% of the number of the total carbon atoms is called as aromatic. The oil used in this invention is preferably paraffinic in the above-mentioned classification, and the naphthenic and aromatic oils are not desirable in respect of dispersibility and dissolvability. The properties of the paraffinic softening agent for rubbers are such that the dynamic viscosity at 37.8° C. is 20 to 500 cst, the pour point is −10° to −15° C., and the flash point is 170° to 300° C.

The amount of the paraffinic oil (f) blended is preferably 30 to 300 parts by weight, more preferably 30 to 250 parts by weight per 100 parts by weight of the rubber component (a). When the amount exceeds 300 parts by weight, the bleeding out of the softening agent tends to be caused, there is a fear that the final product may become tacky, and the mechanical properties tend to be deteriorated. Also, when the amount is less than 30 parts by weight, the effect of addition is not achieved.

The thermoplastic elastomer composition of this invention exhibits superior performances in mechanical strength and high-temperature compression set as compared with the conventional thermoplastic elastomer composition partially crosslinked with an organic peroxide. It is also much superior in light discoloration resistance to the conventional thermoplastic elastomer composition completely crosslinked with a heat-reactive alkylphenol resin. Moreover, the use of the compatibilizing agent results in a remarkable improvement in bonding strength at the interface between the rubber and the thermoplastic resin, and as compared with a thermoplastic elastomer composition crosslinked by only hydrosilylation with a heavy metal catalyst such as chloroplatinic acid as in the known technique, the low-temperature impact resistance is greatly improved and the appearance of the resulting molded article is markedly improved.

In addition to the above-mentioned components, the composition of this invention may, if necessary, contain an inorganic filler particularly when it is applied to a use which does not require toning. This inorganic filler has a benefit of reducing the product cost as an extender, and furthermore positively contributes to the improvement of quality (shape retention resistant to heating, imparting of flame retardance and the like). The inorganic filler includes, for example, calcium carbonate, carbon black, talc, magnesium hydroxide, mica, barium sulfate, natural silicic acid, synthetic silicic acid (white carbon), titanium oxide and the like, and as the carbon black, there may be used channel black, furnace black and the like. Among these inorganic fillers, talc and calcium carbonate are economically advantageous and preferable. In addition, if necessary, nucleating agent, external lubricant, self-lubricating agent, hindered amine light stabilizer, hindered phenol antioxidant, coloring agent, silicone oil and the like may be added. Also, other thermoplastic resins such as styrene block copolymer (SBC), ethylene-α-olefin copolymer, thermoplastic urethane resin and the like may be blended.

The composition of this invention can be prepared by any general method which is used in the production of a usual resin composition or rubber composition.

Basically, a mechanically melt-kneading method is used, and in this method, there are used a single screw extruder, a twin screw extruder, a Bunbury mixer, various kneaders, Bravender, a roll and the like. In this case, the order of addition of each component is not limited, and, for example, the rubber and the resin may previously be pre-mixed by a mixer such as a Henschel mixer, a blender or the like, then melt-kneaded by the above-mentioned kneader, subsequently the crosslinking agent and the catalyst components are added, the resulting mixture is subjected to dynamic vulcanization, thereafter the compatibilizing agent is added thereto, and the resulting mixture is kneaded. Alternatively, when the scorching time of the rubber used is sufficiently long, a method can be adopted which comprises previously melt-kneading the components other than the catalyst, further adding the catalyst thereto and melt-kneading the resulting mixture. In this case, the melt-kneading temperature is preferably selected from the range of from 180° C. to 300° C. and the shear rate is preferably selected from the range of from 100 to 1,000/sec.

Moreover, it is possible to obtain the thermoplastic elastomer composition of this invention by first using the components (a), (c), (d) and (f) to prepare a cured product of the rubber, adding the rough grinds of the cured product of the rubber to the remaining components and then melt-kneading the resulting mixture. The method of obtaining the cured product of the rubber is not particularly limited and all methods which are used in the production of a usual thermosetting resin composition or thermosetting rubber composition, can be used.

Fundamentally, a mechanical melt-kneading method is used, and in this method, there are used a single screw extruder, a twin screw extruder, a Bunbury mixer, various kneaders, Bravender, a roll and the like. In this case, the melt-kneading temperature can be preferably selected from the range of from 180° C. to 300° C. and the shear rate can be preferably selected from the range of from 100 to 1,000/sec.

In order to roughly grind the cured rubber prepared through the above steps, a usual grinding method can be used to achieve the grinding. That is, a freeze-grinding method using dry ice, liquid nitrogen or the like is preferably used. An inorganic filler or the like can be used as a dusting powder. In this case, when a batchwise kneading machine such as a kneader is used and the rubber is sufficiently cured, the grinding step is not provided and the mixture is roughly ground in the kneader, so that the batchwise kneading machine is preferably used.

The dynamically vulcanized elastomer composition thus obtained is thermoplastic, and hence, can be molded by use of a generally used thermoplastic resin molding machine, and various molding methods can be applied such as injection molding, extrusion molding, calender molding, blow molding and the like. That is to say, the dependency of the melt viscosity on shear rate is particularly large and, in the injection molding region of high shear rate, it follows that the mixture has a low viscosity and a high fluidity, and can be easily injection-molded similarly to general purpose resins. Also, in the extrusion-blow molding region of middle shear rate, the mixture has a high viscosity to some extent and this results in a low drawdown, and hence, extrusion-blow molding is easy.

In this invention, a highly functional thermoplastic elastomer composition can be obtained under very sensible kneading conditions. That is to say, the elastomer composition is excellent in flexibility, resistance to heat creep, low-temperature impact resistance and mechanical strength and exhibits excellent rubber elasticity over a wide temperature range. Moreover, the elastomer composition has good oil resistance and can be freely toned, so that the elastomer composition can be preferably molded into automobile parts, domestic appliance parts, various wire coatings (for insulation and sheath) and various industrial parts, for which improvements are desired in oil resistance, rubber elasticity, mechanical strength, molding velocity, molding yield, free coloration and the like.

DESCRIPTION OF THE PREFERRED EMBODIMENTS

This invention is explained in more detail below referring to Examples; however, this invention should not be construed to be limited thereto.

The components used in the following Examples and Comparative Examples are as follows:

Component (a) (1), EPDM

Ethylene-propylene-ethylidenenorbornene copolymer rubber [EP57C manufactured by Japan Synthetic Rubber Co., Ltd., propylene content: 28% by weight, Mooney viscosity $ML_{+4}(100°$ C.): 90, iodine value: 15, Tg: −40° C.]

Component (a) (2), ANR

Acrylonitrile-butadiene copolymer rubber [N240S manufactured by Japan Synthetic Rubber Co., Ltd., Mooney viscosity $ML_{1+4}(100°$ C.): 56, acrylonitrile content: 26% by weight]

Component (a) (3), SBR

Styrene-butadiene copolymer rubber [JSR 1503 manufactured by Japan Synthetic Rubber Co., Ltd., styrene content: 23.5% by weight, Mooney viscosity Ml+4(100° C.): 75]

Component (a) (4): BuR

Butyl rubber [JSR Butyl 268 manufactured by Japan Synthetic Rubber Co., Ltd., degree of unsaturation: 1.5% by mole, Mooney viscosity $ML_{1+4}(125°$ C.): 51]

Component (b) (1), PP

Polypropylene [W501 manufactured by Sumitomo Chemical Co., Ltd., MFR (230° C.): 8.0 g/10 min, heat distortion temperature: 115° C.]

Component (b) (2), PET

Polyethylene terephthalate [Dianite PA500 manufactured by Mitsubishi Rayon Co., Ltd.]

Component (b) (3), Ny66

Polyamide (PA)-66 [Ubenylon 2020B manufactured by Ube Industries, Ltd.]

Component (b) (4), PVC

Vinyl chloride resin [Sumilite SX-17 manufactured by Sumitomo Chemical Co., Ltd., straight, average degree of polymerization: 1700]

Component (c) (1), SiH(1)

1,3,5,7-Tetramethylcyclotetrasiloxane [manufactured by Toray. Dow Corning. Silicone Co., Ltd.]

Component (c) (2), SiH(2)

1,1,3,3-Tetramethylditetrasiloxane [manufactured by Toray•Dow Corning•Silicone Co., Ltd.]

Component (d) (1), Catalyst (1)

Chloroplatinic acid hexahydrate [manufactured by Yasuda Yakuhin K. K.]

Component (d) (2), Catalyst(2)

Dicumyl peroxide [Percumyl D manufactured by NOF CORP.]

Component (d) (3), Catalyst(3)

A catalyst prepared by supporting 1 g of a 1% by weight solution of the component (d) (1) in 2-propanol on 100 g of silica [Nipsil VN3 manufactured by Nippon Silica Co., Ltd.]

Component (e-1), SEBS

Styrene-ethylene-butylene-styrene copolymer (SEBS) [TUFTEC H1041 manufactured by ASAHI CHEMICAL INDUSTRY CO., LTD.]

Component (e-3), EP-SEBS

Epoxy-modified styrene-ethylene-butylene-styrene copolymer (SEBS) [TUFTEC Z514 manufactured by ASAHI CHEMICAL CO., LTD.]

Component (e-7), MAH-EP

Maleic anhydride-modified ethylene-propylene copolymer [EP T7741P manufactured by Japan Synthetic Rubber Co., Ltd.]

Component (e-9), E-GMA-AM

Ethylene-glycidyl methacrylate-methyl acrylate terpolymer [Bondfast 7M manufactured by Sumitomo Chemical Co., Ltd.]

Component (e-10), VA-PVC

Vinyl acetate-vinyl chloride copolymer [Sumigraft GE manufactured by Sumitomo Chemical Co., Ltd.]

Component (e-12), PP-MAH

To 100 parts by weight of polypropylene oligomer having an average molecular weight of 4,000 terminally modified with maleic anhydride was added 80 parts by weight of an epoxy-modified styrene-ethylene-butylene-styrene copolymer (TUFTEC Z514), and the resulting mixture was stirred sufficiently in a Henschel mixer and then melt-kneaded at about 200° C. for 20 minutes by a kneader to form a roll sheet, after which the roll sheet was cooled to room temperature and then pelletized by a sheet pelletizer to prepare the compatibilizing agent (e-12). The infrared abortion spectrum of the compatibilizing agent (e-12) indicated that the characteristic absorptions due to epoxy group and acid anhydride group contained in the starting materials disappeared, whereby it is considered that reaction was caused between the epoxy group and the acid anhydride group.

Component (f), OIL

Paraffinic process oil [Diana Process Oil PW-380 manufactured by Idemitsu Kosan Co., Ltd., dynamic viscosity: 381.6 cst (40° C.), 30.1 cst (100° C.), average molecular weight: 746, ring analysis values: CA=0%, CN=27%, CP=73%]

Examples 1 to 84 and Comparative Examples 1 to 42

All components other than the components (c) and (d) were sufficiently dry-blended in the amounts shown in Tables 1–21, and the resulting mixture was melt-kneaded and extruded by a twin screw kneader under such conditions that the resin temperature became 190° to 270° C. to obtain a thermoplastic resin composition before dynamic vulcanization, and this was pelletized. To the pellets obtained were added the components (c) and (d) in the amounts shown in Tables 1–21, and the resulting mixture was again kneaded by a twin screw kneader at a shear rate of 800/sec under such conditions that the resin temperature became 190° to 270° C. to obtain a dynamically vulcanized thermoplastic elastomer composition. This composition was injection-molded and the resulting molded article was subjected to the following evaluations of physical properties. The results obtained in Examples are shown in Tables 1 to 14 and those obtained in Comparative Examples are shown in Tables 15 to 21.

The evaluation methods were as follows:

(1) Hardness: JIS K6301A type (2) Tensile strength TS [MPa] and elongation Eb (%): JIS K6301, No. 3 dumbbell (3) Compression set CS (%): JIS K6301, 25% compression, 70° C.×22 hrs (4) Low-temperature impact resistance: A test piece of 75 mm×75 mm×t1 mm was immersed in a dry ice-methanol solution at −60° C. for 10 minutes and then subjected to the Du Pont type impact test. The case where no cracks were formed after the test is indicated as o and the case where cracks were formed after the test is indicated as x.

[Test conditions: weight: 500 g, point R: 3/16 inch, falling height: 1 m]

(5) Oil resistance (%): JIS K6301 in which a test piece of 50 mm×50 mm×t2 mm was immersed in a No. 3 test oil (lubricant) at 70° C. for two hours and the weight change (%) between before and after the immersion was determined.

(6) Light discoloration resistance test: A natural composition was treated at 88° C. for 1,000 hours in a sunshine weatherometer and the color difference was measured.

(7) Moldability test: Using a 50-mm diameter extruder provided with a screw having an L/D of 20 and dies having a size of 100 mm×t0.5, a tape having a size of 150×500 mm was prepared under the conditions that C/R was 3.0, the kneading temperature was 200° C. and the revolution rate was 100 rpm, and the surface of the tape was observed visually. The case where at least one foreign matter having a diameter of 100 microns or more was observed is indicated as x, and the case where no foreign matter was observed is indicated as o.

(8) Long term reliability: A low-temperature impact resistance test was conducted according to (4) above after the treatment at 100° C. for 1,000 hours.

The case where no cracks were formed is indicated as o, and the case where cracks were formed is indicated as x.

In Comparative Examples 1 to 6, the same procedure as in the Examples was repeated, except that 2 parts by weight of dicumyl peroxide (DCP) (organic peroxide) and 3 parts by weight of divinylbenzene (DVB) were used in the dynamic vulcanization. Moreover, in Comparative Examples 7 to 12, the same procedure as in the Examples was repeated, except that 5 parts by weight of a heat-reactive alkylphenol resin [SP1045 manufactured by Schenectady Chemicals] and 2 parts by weight of stannous chloride (crosslinking assistant) were used in the dynamic vulcanization. Also, in Comparative Examples 13 to 18, an organosiloxane was used as the crosslinking agent and the same chloroplatinic acid hexahydrate as the component (d) in the Examples was used as the catalyst.

From the results shown in Tables 1 to 21, it is clear that the thermoplastic elastomer composition of this invention in which the dynamic vulcanization was conducted with an organosiloxane and to which a compatibilizing agent was added, is superior in mechanical strength, compression set at 70° C. and oil resistance to the prior art thermoplastic elastomer composition in which an organoperoxide was blended and which was dynamically vulcanized. Furthermore, it has been clarified that the composition of this invention is good in light discoloration resistance, and hence, has a large freeness of coloration. Also, it is found that the vulcanized rubber particles of this invention were highly dispersed and the low-temperature impact resistance was greatly improved.

TABLE 1

| | Example | | | | | |
|---|---|---|---|---|---|---|
| | 1 | 2 | 3 | 4 | 5 | 6 |
| Composition (parts by weight) | | | | | | |
| EPDM | 100 | 100 | 100 | 100 | 100 | 100 |
| PP | 100 | 200 | 95 | 195 | 100 | |
| PET | | | | | | 100 |
| SiH (1) | 3 | 3 | 3 | 6 | | 3 |
| SiH (2) | | | | | 3 | |
| Catalyst (1) | 0.5 | 0.5 | 0.5 | 0.5 | 0.5 | 0.5 |
| SEBS | 10 | 10 | 10 | 10 | 10 | 10 |
| OIL | 100 | 200 | 190 | 280 | 100 | 100 |
| Physical properties | | | | | | |
| Hardness | 81 | 88 | 78 | 89 | 84 | 85 |
| TS (MPa) | 19 | 18 | 14 | 13 | 19 | 19 |
| Eb (%) | 625 | 590 | 625 | 510 | 605 | 615 |
| CS (%) | 37 | 39 | 29 | 44 | 33 | 34 |
| Low-temp. impact resistance | o | o | o | o | o | o |
| Oil resistance (%) | 15 | 9 | 15 | 9 | 14 | 15 |
| Light discoloration resistance | 8 | 7 | 8 | 8 | 9 | 8 |
| Moldability test | o | o | o | o | o | o |
| Long-term reliability | o | o | o | o | o | o |

TABLE 2

| | Example | | | | | |
|---|---|---|---|---|---|---|
| | 7 | 8 | 9 | 10 | 11 | 12 |
| Composition (parts by weight) | | | | | | |
| EPDM | 100 | 100 | 100 | 100 | 100 | 100 |
| PP | | | 100 | 100 | | |
| PET | 100 | 195 | | | 100 | 100 |
| SiH (1) | | | 3 | 3 | 3 | |
| SiH (2) | 3 | | | | | 3 | 
| Catalyst (1) | 0.5 | 0.5 | 0.5 | 0.5 | 0.5 | 0.5 |
| SEBS | 10 | 10 | 5 | 20 | 5 | 20 |
| OIL | 100 | 280 | 100 | 100 | 100 | 100 |
| Physical properties | | | | | | |
| Hardness | 83 | 87 | 79 | 82 | 82 | 85 |
| TS (MPa) | 19 | 13 | 18 | 21 | 17 | 20 |
| Eb (%) | 620 | 540 | 620 | 580 | 610 | 540 |
| CS (%) | 34 | 42 | 33 | 39 | 31 | 38 |
| Low-temp. impact resistance | ○ | ○ | ○ | ○ | ○ | ○ |
| Oil resistance (%) | 12 | 9 | 13 | 13 | 14 | 12 |
| Light discoloration resistance | 9 | 8 | 8 | 9 | 8 | 9 |
| Moldability test | ○ | ○ | ○ | ○ | ○ | ○ |
| Long-term reliability | ○ | ○ | ○ | ○ | ○ | ○ |

Note: SiH(2) row — value 3 appears in columns 7, 11, 12.

TABLE 3

| | Example | | | | | |
|---|---|---|---|---|---|---|
| | 13 | 14 | 15 | 16 | 17 | 18 |
| Composition (parts by weight) | | | | | | |
| EPDM | 100 | 100 | 100 | 100 | 100 | 100 |
| PP | 100 | 100 | | | 100 | |
| PET | | | 100 | 100 | | 100 |
| SiH (1) | 3 | | 3 | | | 3 |
| SiH (2) | | 3 | | 3 | 3 | |
| Catalyst (1) | 0.5 | 0.5 | 0.5 | 0.5 | 0.5 | 0.5 |
| EP-SEBS | 10 | 10 | 10 | 10 | 5 | 20 |
| OIL | 100 | 100 | 100 | 100 | 100 | 100 |
| Physical properties | | | | | | |
| Hardness | 82 | 84 | 83 | 87 | 84 | 85 |
| TS (MPa) | 18 | 18 | 19 | 19 | 18 | 20 |
| Eb (%) | 580 | 570 | 570 | 540 | 580 | 540 |
| CS (%) | 35 | 33 | 38 | 36 | 32 | 39 |
| Low-temp. impact resistance | ○ | ○ | ○ | ○ | ○ | ○ |
| Oil resistance (%) | 11 | 10 | 14 | 11 | 13 | 11 |
| Light discoloration resistance | 9 | 10 | 8 | 9 | 10 | 10 |
| Moldability test | ○ | ○ | ○ | ○ | ○ | ○ |
| Long-term reliability | ○ | ○ | ○ | ○ | ○ | ○ |

TABLE 4

| | Example | | | | | |
|---|---|---|---|---|---|---|
| | 19 | 20 | 21 | 22 | 23 | 24 |
| Composition (parts by weight) | | | | | | |
| EPDM | 100 | 100 | 100 | 100 | 100 | 100 |
| PP | 100 | 100 | | | 100 | |
| Ny66 | | | 100 | 100 | | 100 |
| SiH (1) | 3 | | 3 | | | 3 |
| SiH (2) | | 3 | | 3 | 3 | |
| Catalyst (1) | 0.5 | 0.5 | 0.5 | 0.5 | 0.5 | 0.5 |
| MAH-EP | 10 | 10 | 10 | 10 | 5 | 20 |
| OIL | 100 | 100 | 100 | 100 | 100 | 100 |
| Physical properties | | | | | | |
| Hardness | 81 | 83 | 82 | 84 | 81 | 87 |
| TS (MPa) | 15 | 16 | 17 | 18 | 14 | 19 |
| Eb (%) | 600 | 595 | 610 | 580 | 630 | 550 |
| CS (%) | 37 | 35 | 35 | 34 | 34 | 37 |
| Low-temp. impact resistance | ○ | ○ | ○ | ○ | ○ | ○ |
| Oil resistance (%) | 14 | 13 | 14 | 12 | 15 | 13 |
| Light discoloration resistance | 8 | 9 | 8 | 10 | 9 | 9 |
| Moldability test | ○ | ○ | ○ | ○ | ○ | ○ |
| Long-term reliability | ○ | ○ | ○ | ○ | ○ | ○ |

TABLE 5

| | Example | | | | | |
|---|---|---|---|---|---|---|
| | 25 | 26 | 27 | 28 | 29 | 30 |
| Composition (parts by weight) | | | | | | |
| EPDM | 100 | 100 | 100 | 100 | 100 | 100 |
| PP | 100 | 200 | 95 | 195 | 100 | |
| PET | | | | | | 100 |
| SiH (1) | 3 | 3 | 3 | 6 | | 3 |
| SiH (2) | | | | | 3 | |
| Catalyst (1) | 0.5 | 0.5 | 0.5 | 0.5 | 0.5 | 0.5 |
| E-GMA-AM | 10 | 10 | 10 | 10 | 10 | 20 |
| OIL | 100 | 200 | 190 | 280 | 100 | 100 |
| Physical properties | | | | | | |
| Hardness | 81 | 88 | 78 | 89 | 84 | 85 |
| TS (MPa) | 19 | 18 | 14 | 13 | 19 | 19 |
| Eb (%) | 625 | 590 | 625 | 510 | 605 | 615 |
| CS (%) | 37 | 39 | 29 | 44 | 33 | 34 |
| Low-temp. impact resistance | ○ | ○ | ○ | ○ | ○ | ○ |
| Oil resistance (%) | 15 | 9 | 15 | 9 | 14 | 15 |
| Light discoloration resistance | 8 | 7 | 8 | 8 | 9 | 8 |
| Moldability test | ○ | ○ | ○ | ○ | ○ | ○ |
| Long-term reliability | ○ | ○ | ○ | ○ | ○ | ○ |

TABLE 6

| | Example | | | | | |
|---|---|---|---|---|---|---|
| | 31 | 32 | 33 | 34 | 35 | 36 |
| Composition (parts by weight) | | | | | | |
| ANR | 100 | 100 | 100 | 100 | 100 | 100 |
| PP | 100 | 100 | | | 100 | |
| PET | | | 100 | 100 | | 100 |
| SiH (1) | 3 | | 3 | | 3 | |
| SiH (2) | | 3 | | 3 | | 3 |
| Catalyst (1) | 0.5 | 0.5 | 0.5 | 0.5 | 0.5 | 0.5 |
| E-GMA-AM | 10 | 10 | 10 | 10 | 10 | 10 |
| OIL | 100 | 100 | 100 | 100 | 100 | 100 |
| Physical properties | | | | | | |
| Hardness | 81 | 83 | 82 | 84 | 83 | 82 |
| TS (MPa) | 17 | 18 | 18 | 19 | 20 | 20 |
| Eb (%) | 600 | 600 | 590 | 560 | 610 | 620 |
| CS (%) | 34 | 32 | 35 | 31 | 32 | 29 |
| Low-temp. impact resistance | ○ | ○ | ○ | ○ | ○ | ○ |
| Oil resistance (%) | 12 | 11 | 13 | 8 | 11 | 11 |

TABLE 6-continued

| | Example | | | | | |
|---|---|---|---|---|---|---|
| | 31 | 32 | 33 | 34 | 35 | 36 |
| Light discoloration resistance | 9 | 9 | 8 | 9 | 10 | 10 |
| Moldability test | ○ | ○ | ○ | ○ | ○ | ○ |
| Long-term reliability | ○ | ○ | ○ | ○ | ○ | ○ |

TABLE 7

| | Example | | | | | |
|---|---|---|---|---|---|---|
| | 37 | 38 | 39 | 40 | 41 | 42 |
| Composition (parts by weight) | | | | | | |
| SBR | 100 | 100 | 100 | 100 | 100 | 100 |
| PP | 100 | 100 | | | 100 | |
| PET | | | 100 | 100 | | 100 |
| SiH (1) | 3 | | 3 | | 3 | |
| SiH (2) | | 3 | | 3 | | 3 |
| Catalyst (1) | 0.5 | 0.5 | 0.5 | 0.5 | 0.5 | 0.5 |
| E-GMA-AM | 10 | 10 | 10 | 10 | 10 | 10 |
| OIL | 1.00 | 100 | 100 | 100 | 100 | 100 |
| Physical properties | | | | | | |
| Hardness | 79 | 83 | 82 | 84 | 83 | 82 |
| TS (MPa) | 15 | 16 | 16 | 17 | 18 | 18 |
| Eb (%) | 630 | 630 | 610 | 580 | 630 | 650 |
| CS (%) | 38 | 34 | 36 | 33 | 34 | 33 |
| Low-temp. impact resistance | ○ | ○ | ○ | ○ | ○ | ○ |
| Oil resistance (%) | 14 | 13 | 14 | 11 | 12 | 13 |
| Light discoloration resistance | 8 | 8 | 8 | 9 | 9 | 9 |
| Moldability test | ○ | ○ | ○ | ○ | ○ | ○ |
| Long-term reliability | ○ | ○ | ○ | ○ | ○ | ○ |

TABLE 8

| | Example | | | | | |
|---|---|---|---|---|---|---|
| | 43 | 44 | 45 | 46 | 47 | 48 |
| Composition (parts by weight) | | | | | | |
| BuR | 100 | 100 | 100 | 100 | 100 | 100 |
| PP | 100 | 100 | | | 100 | |
| PET | | | 100 | 100 | | 100 |
| SiH (1) | 3 | | 3 | | 3 | |
| SiH (2) | | 3 | | 3 | | 3 |
| Catalyst (1) | 0.5 | 0.5 | 0.5 | 0.5 | 0.5 | 0.5 |
| E-GMA-AM | 10 | 10 | 10 | 10 | 10 | 10 |
| OIL | 100 | 100 | 100 | 100 | 100 | 100 |
| Physical properties | | | | | | |
| Hardness | 79 | 83 | 82 | 84 | 83 | 82 |
| TS (MPa) | 15 | 16 | 16 | 17 | 18 | 18 |
| Eb (%) | 630 | 630 | 610 | 580 | 630 | 650 |
| CS (%) | 34 | 30 | 32 | 30 | 30 | 28 |
| Low-temp. impact resistance | ○ | ○ | ○ | ○ | ○ | ○ |
| Oil resistance (%) | 10 | 10 | 11 | 9 | 9 | 10 |
| Light discoloration resistance | 7 | 7 | 7 | 8 | 8 | 8 |
| Moldability test | ○ | ○ | ○ | ○ | ○ | ○ |
| Long-term reliability | ○ | ○ | ○ | ○ | ○ | ○ |

TABLE 9

| | Example | | | | | |
|---|---|---|---|---|---|---|
| | 49 | 50 | 51 | 52 | 53 | 54 |
| Composition (parts by weight) | | | | | | |
| ANR | 100 | 100 | 100 | 100 | 50 | 50 |
| PVC | 100 | 100 | 50 | 50 | 100 | 100 |
| SiH (1) | 3 | | 3 | | 1.5 | |
| SiH (2) | | 3 | | 3 | | 1.5 |
| Catalyst (1) | 0.5 | 0.5 | 0.5 | 0.5 | 0.5 | 0.5 |
| E-GMA-AM | 10 | 10 | 10 | | | |
| VA-PVC | | | | 10 | 10 | 10 |
| OIL | 100 | 100 | 100 | 100 | 100 | 100 |
| Physical properties | | | | | | |
| Hardness | 79 | 83 | 62 | 64 | 83 | 82 |
| TS (MPa) | 15 | 16 | 14 | 15 | 20 | 21 |
| Eb (%) | 530 | 530 | 560 | 580 | 430 | 450 |
| CS (%) | 34 | 30 | 27 | 25 | 40 | 38 |
| Low-temp. impact resistance | ○ | ○ | ○ | ○ | ○ | ○ |
| Oil resistance (%) | 10 | 10 | 11 | 9 | 9 | 10 |
| Light discoloration resistance | 9 | 9 | 9 | 9 | 9 | 9 |
| Moldability test | ○ | ○ | ○ | ○ | ○ | ○ |
| Long-term reliability | ○ | ○ | ○ | ○ | ○ | ○ |

TABLE 10

| | Example | | | | | |
|---|---|---|---|---|---|---|
| | 55 | 56 | 57 | 58 | 59 | 60 |
| Composition (parts by weight) | | | | | | |
| EPDM | 100 | 100 | 100 | 100 | 100 | 100 |
| PP | 100 | 200 | 95 | 195 | 100 | |
| PET | | | | | | 100 |
| SiH (1) | 3 | 3 | 3 | 6 | | 3 |
| SiH (2) | | | | | 3 | |
| Catalyst (1) | 0.5 | 0.5 | 0.5 | 0.5 | 0.5 | 0.5 |
| PP-MAH | 10 | 10 | 10 | 10 | 10 | 10 |
| OIL | 100 | 200 | 90 | 280 | 100 | 100 |
| Physical properties | | | | | | |
| Hardness | 81 | 88 | 78 | 89 | 84 | 85 |
| TS (MPa) | 19 | 18 | 16 | 13 | 19 | 19 |
| Eb (%) | 635 | 595 | 630 | 510 | 605 | 615 |
| CS (%) | 36 | 38 | 28 | 42 | 31 | 32 |
| Low-temp. impact resistance | ○ | ○ | ○ | ○ | ○ | ○ |
| Oil resistance (%) | 14 | 8 | 14 | 9 | 13 | 14 |
| Light discoloration resistance | 8 | 7 | 8 | 8 | 9 | 8 |
| Moldability test | ○ | ○ | ○ | ○ | ○ | ○ |
| Long-term reliability | ○ | ○ | ○ | ○ | ○ | ○ |

TABLE 11

| | Example | | | | | |
|---|---|---|---|---|---|---|
| | 61 | 62 | 63 | 64 | 65 | 66 |
| Composition (parts by weight) | | | | | | |
| EPDM | 100 | 100 | 100 | 100 | 100 | 100 |
| PP | 100 | 200 | 95 | 195 | 100 | 100 |
| SiH (1) | 3 | 3 | 3 | 6 | | |
| SiH (2) | | | | | 3 | 3 |
| Catalyst (2) | 0.2 | 0.2 | 0.2 | 0.2 | 0.2 | 0.2 |
| SEBS | 10 | 10 | 10 | 10 | 10 | 10 |
| OIL | 100 | 200 | 190 | 280 | 100 | 100 |

TABLE 11-continued

| | Example | | | | | |
|---|---|---|---|---|---|---|
| | 61 | 62 | 63 | 64 | 65 | 66 |
| Physical properties | | | | | | |
| Hardness | 80 | 86 | 75 | 89 | 83 | 82 |
| TS (MPa) | 19 | 17 | 14 | 12 | 20 | 20 |
| Eb (%) | 630 | 600 | 650 | 510 | 600 | 620 |
| CS (%) | 35 | 39 | 29 | 44 | 34 | 36 |
| Low-temp. impact resistance | o | o | o | o | o | o |
| Oil resistance (%) | 14 | 9 | 15 | 8 | 14 | 15 |
| Light discoloration resistance | 8 | 7 | 8 | 9 | 9 | 8 |
| Moldability test | o | o | o | o | o | o |
| Long-term reliability | o | o | o | o | o | o |

TABLE 12

| | Example | | | | | |
|---|---|---|---|---|---|---|
| | 67 | 68 | 69 | 70 | 71 | 72 |
| Composition (parts by weight) | | | | | | |
| ANR | 100 | 100 | 100 | 100 | 100 | 100 |
| PET | 100 | 195 | 100 | 100 | 100 | 100 |
| SiH (1) | | 3 | 3 | 3 | | |
| SiH (2) | 3 | | | | 3 | 3 |
| Catalyst (2) | 2 | 2 | 2 | 2 | 2 | 2 |
| EP-SEBS | 10 | 10 | | 10 | 10 | |
| E-GMA-AM | | | 10 | | | 10 |
| OIL | 100 | 280 | 100 | 100 | 100 | 100 |
| Physical properties | | | | | | |
| Hardness | 82 | 87 | 79 | 82 | 84 | 81 |
| TS (MPa) | 19 | 13 | 20 | 21 | 22 | 18 |
| Eb (%) | 640 | 540 | 620 | 580 | 590 | 640 |
| CS (%) | 33 | 42 | 33 | 32 | 32 | 33 |
| Low-temp. impact resistance | o | o | o | o | o | o |
| Oil resistance (%) | 13 | 8 | 13 | 13 | 13 | 12 |
| Light discoloration resistance | 8 | 9 | 8 | 9 | 8 | 9 |
| Moldability test | o | o | o | o | o | o |
| Long-term reliability | o | o | o | o | o | o |

TABLE 13

| | Example | | | | | |
|---|---|---|---|---|---|---|
| | 73 | 74 | 75 | 76 | 77 | 78 |
| Composition (parts by weight) | | | | | | |
| EPDM | 100 | 100 | 100 | 100 | 100 | 100 |
| PP | 100 | 200 | 95 | 195 | 100 | 100 |
| SiH (1) | 3 | 3 | 3 | 6 | | |
| SiH (2) | | | | | 3 | 3 |
| Catalyst (3) | 10 | 10 | 10 | 10 | 10 | 10 |
| SEBS | 10 | 10 | 10 | 10 | 10 | 10 |
| OIL | 100 | 200 | 190 | 280 | 100 | 100 |
| Physical properties | | | | | | |
| Hardness | 81 | 86 | 78 | 89 | 85 | 85 |
| TS (MPa) | 20 | 18 | 14 | 12 | 20 | 20 |
| Eb (%) | 630 | 600 | 650 | 510 | 600 | 620 |
| CS (%) | 35 | 39 | 28 | 43 | 32 | 34 |
| Low-temp. impact resistance | o | o | o | o | o | o |
| Oil resistance (%) | 13 | 9 | 14 | 8 | 14 | 15 |
| Light discoloration resistance | 8 | 7 | 8 | 9 | 9 | 8 |
| Moldability test | o | o | o | o | o | o |
| Long-term reliability | o | o | o | o | o | o |

TABLE 14

| | Example | | | | | |
|---|---|---|---|---|---|---|
| | 79 | 80 | 81 | 82 | 83 | 84 |
| Composition (parts by weight) | | | | | | |
| ANR | 100 | 100 | 100 | 100 | 100 | 100 |
| PET | 100 | 195 | 100 | 100 | 100 | 100 |
| SiH (1) | | 3 | 3 | 6 | | |
| SiH (2) | 3 | | | | 3 | 3 |
| Catalyst (3) | 10 | 10 | 10 | 10 | 10 | 10 |
| EP-SEBS | 10 | 10 | | 10 | 10 | |
| E-GMA-AM | | | 10 | | | 10 |
| OIL | 100 | 280 | 100 | 100 | 100 | 100 |
| Physical properties | | | | | | |
| Hardness | 82 | 86 | 80 | 82 | 84 | 81 |
| TS (MPa) | 19 | 13 | 21 | 21 | 22 | 18 |
| Eb (%) | 640 | 540 | 600 | 570 | 580 | 630 |
| CS (%) | 32 | 41 | 32 | 32 | 32 | 33 |
| Low-temp. impact resistance | o | o | o | o | o | o |
| Oil resistance (%) | 12 | 8 | 12 | 12 | 12 | 10 |
| Light discoloration resistance | 8 | 9 | 8 | 9 | 8 | 9 |
| Moldability test | o | o | o | o | o | o |
| Long-term reliability | o | o | o | o | o | o |

TABLE 15

| | Comparative Example | | | | | |
|---|---|---|---|---|---|---|
| | 1 | 2 | 3 | 4 | 5 | 6 |
| Composition (parts by weight) | | | | | | |
| EPDM | 100 | 100 | 100 | 100 | 100 | 100 |
| PP | 100 | 200 | 95 | 195 | | |
| PET | | | | | 100 | 195 |
| DVB | 3 | 3 | 3 | 3 | 3 | 3 |
| DCP | 2 | 2 | 2 | 2 | 2 | 2 |
| OIL | 100 | 200 | 190 | 280 | 100 | 280 |
| Physical properties | | | | | | |
| Hardness | 80 | 86 | 77 | 88 | 79 | 86 |
| TS (MPa) | 11 | 12 | 9 | 10 | 12 | 8 |
| Eb (%) | 510 | 480 | 500 | 430 | 490 | 480 |
| CS (%) | 45 | 50 | 50 | 52 | 44 | 51 |
| Low-temp. impact resistance | x | x | x | x | x | x |
| Oil resistance (%) | 18 | 19 | 22 | 13 | 19 | 12 |
| Light discoloration resistance | 8 | 7 | 8 | 9 | 9 | 8 |
| Moldability test | o | o | o | o | o | o |
| Long-term reliability | x | x | x | x | x | x |

TABLE 16

| | Comparative Example | | | | | |
|---|---|---|---|---|---|---|
| | 7 | 8 | 9 | 10 | 11 | 12 |
| Composition (parts by weight) | | | | | | |
| EPDM | 100 | 100 | 100 | 100 | 100 | 100 |
| PP | 100 | 200 | 95 | 195 | | |
| PET | | | | | 100 | 195 |
| SP1045 | 5 | 5 | 5 | 5 | 5 | 5 |
| Stannous chloride | 2 | 2 | 2 | 2 | 2 | 2 |
| OIL | 100 | 200 | 190 | 280 | 100 | 280 |
| Physical properties | | | | | | |
| Hardness | 80 | 86 | 77 | 88 | 79 | 86 |
| TS (MPa) | 18 | 17 | 14 | 12 | 20 | 20 |
| Eb (%) | 620 | 600 | 630 | 510 | 600 | 620 |
| CS (%) | 37 | 40 | 31 | 45 | 34 | 43 |
| Low-temp. impact resistance | x | x | x | x | x | x |
| Oil resistance (%) | 14 | 10 | 16 | 9 | 14 | 9 |
| Light discoloration resistance | 28 | 27 | 30 | 29 | 29 | 28 |
| Moldability test | x | x | x | x | x | x |
| Long-term reliability | x | x | x | x | x | x |

TABLE 17

| | Comparative Example | | | | | |
|---|---|---|---|---|---|---|
| | 13 | 14 | 15 | 16 | 17 | 18 |
| Composition (parts by weight) | | | | | | |
| EPDM | 100 | 100 | 100 | 100 | 100 | 100 |
| PP | 100 | 200 | 95 | | 100 | |
| PET | | | | 100 | | 100 |
| SiH (1) | 3 | 3 | 3 | 3 | | 3 |
| SiH (2) | | | | | 3 | |
| Catalyst (1) | 0.5 | 0.5 | 0.5 | 0.5 | 0.5 | 0.5 |
| OIL | 100 | 200 | 190 | 100 | 100 | 100 |
| Physical properties | | | | | | |
| Hardness | 80 | 86 | 75 | 82 | 83 | 82 |
| TS (MPa) | 19 | 17 | 14 | 18 | 20 | 20 |
| Eb (%) | 630 | 600 | 650 | 630 | 600 | 620 |
| CS (%) | 35 | 39 | 29 | 32 | 34 | 36 |
| Low-temp. impact resistance | x | x | x | x | x | x |
| Oil resistance (%) | 14 | 9 | 15 | 13 | 14 | 15 |
| Light discoloration resistance | 8 | 7 | 8 | 9 | 9 | 8 |
| Moldability test | x | x | x | x | x | x |
| Long-term reliability | x | x | x | x | x | x |

TABLE 18

| | Comparative Example | | | | | |
|---|---|---|---|---|---|---|
| | 19 | 20 | 21 | 22 | 23 | 24 |
| Composition (parts by weight) | | | | | | |
| ANR | 100 | 100 | 100 | 100 | 100 | 100 |
| PP | 100 | 100 | | | 100 | |
| PET | | | 100 | 100 | | 100 |
| SiH (1) | 3 | | 3 | | 3 | |
| SiH (2) | | 3 | | 3 | | 3 |
| Catalyst (1) | 0.5 | 0.5 | 0.5 | 0.5 | 0.5 | 0.5 |
| OIL | 100 | 100 | 100 | 100 | 100 | 100 |
| Physical properties | | | | | | |
| Hardness | 81 | 83 | 82 | 84 | 83 | 82 |
| TS (MPa) | 17 | 18 | 18 | 19 | 20 | 20 |
| Eb (%) | 600 | 600 | 590 | 560 | 610 | 620 |
| CS (%) | 34 | 32 | 35 | 31 | 32 | 29 |
| Low-temp. impact resistance | x | x | x | x | x | x |
| Oil resistance (%) | 12 | 11 | 13 | 8 | 11 | 11 |
| Light discoloration resistance | 9 | 9 | 8 | 9 | 10 | 10 |
| Moldability test | x | x | x | x | x | x |
| Long-term reliability | x | x | x | x | x | x |

TABLE 19

| | Comparative Example | | | | | |
|---|---|---|---|---|---|---|
| | 25 | 26 | 27 | 28 | 29 | 30 |
| Composition (parts by weight) | | | | | | |
| SBR | 100 | 100 | 100 | 100 | 100 | 100 |
| PP | 100 | 100 | | | 100 | |
| PET | | | 100 | 100 | | 100 |
| SiH (1) | 3 | | 3 | | 3 | |
| SiH (2) | | 3 | | 3 | | 3 |
| Catalyst (1) | 0.5 | 0.5 | 0.5 | 0.5 | 0.5 | 0.5 |
| OIL | 100 | 100 | 100 | 100 | 100 | 100 |
| Physical properties | | | | | | |
| Hardness | 79 | 83 | 82 | 84 | 83 | 82 |
| TS (MPa) | 15 | 16 | 16 | 17 | 18 | 18 |
| Eb (%) | 630 | 630 | 610 | 580 | 630 | 650 |
| CS (%) | 38 | 34 | 36 | 33 | 34 | 33 |
| Low-temp. impact resistance | x | x | x | x | x | x |
| Oil resistance (%) | 14 | 13 | 14 | 11 | 12 | 13 |
| Light discoloration resistance | 8 | 8 | 8 | 9 | 9 | 9 |
| Moldability test | x | x | x | x | x | x |
| Long-term reliability | x | x | x | x | x | x |

TABLE 20

| | Comparative Example | | | | | |
|---|---|---|---|---|---|---|
| | 31 | 32 | 33 | 34 | 35 | 36 |
| Composition (parts by weight) | | | | | | |
| BuR | 100 | 100 | 100 | 100 | 100 | 100 |
| PP | 100 | 100 | | | 100 | |
| PET | | | 100 | 100 | | 100 |
| SiH (1) | 3 | | 3 | | 3 | |
| SiH (2) | | 3 | | 3 | | 3 |
| Catalyst (1) | 0.5 | 0.5 | 0.5 | 0.5 | 0.5 | 0.5 |
| OIL | 100 | 100 | 100 | 100 | 100 | 100 |
| Physical properties | | | | | | |
| Hardness | 79 | 83 | 82 | 84 | 83 | 82 |
| TS (MPa) | 15 | 16 | 16 | 17 | 18 | 18 |
| Eb (%) | 630 | 630 | 610 | 580 | 630 | 650 |
| CS (%) | 34 | 30 | 32 | 30 | 30 | 28 |
| Low-temp. impact resistance | x | x | x | x | x | x |
| Oil resistance (%) | 10 | 10 | 11 | 9 | 9 | 10 |
| Light discoloration resistance | 7 | 7 | 7 | 8 | 8 | 8 |
| Moldability test | x | x | x | x | x | x |
| Long-term reliability | x | x | x | x | x | x |

TABLE 21

| | Comparative Example | | | | | |
|---|---|---|---|---|---|---|
| | 37 | 38 | 39 | 40 | 41 | 42 |
| Composition (parts by weight) | | | | | | |
| ANR | 100 | 100 | 100 | 100 | 50 | 50 |
| PVC | 100 | 100 | 50 | 50 | 100 | 100 |
| SiH (1) | 3 | | 3 | | 1.5 | |
| SiH (2) | | 3 | | 3 | | 1.5 |
| Catalyst (1) | 0.5 | 0.5 | 0.5 | 0.5 | 0.5 | 0.5 |
| OIL | 100 | 100 | 100 | 100 | 100 | 100 |
| Physical properties | | | | | | |
| Hardness | 79 | 83 | 62 | 64 | 83 | 82 |
| TS (MPa) | 15 | 16 | 14 | 15 | 20 | 21 |
| Eb (%) | 530 | 530 | 560 | 580 | 430 | 450 |
| CS (%) | 34 | 30 | 27 | 25 | 40 | 38 |
| Low-temp. impact resistance | x | x | x | x | x | x |
| Oil resistance (%) | 10 | 10 | 11 | 9 | 9 | 10 |
| Light discoloration resistance | 9 | 9 | 9 | 9 | 9 | 9 |
| Moldability test | x | x | x | x | x | x |
| Long-term reliability | x | x | x | x | x | x |

What is claimed is:

1. A thermoplastic elastomer composition obtained by dynamically heat-treating a mixture of (a) 100 parts by weight of a carbon-to-carbon double bond-containing rubber, (b) 5 to 300 parts by weight of a thermoplastic resin, (c) 0.5 to 30 parts by weight of an organo-siloxane crosslinking agent having at least two SiH groups in the molecule, (d) 0.001 to 20 parts by weight of a hydrosilylating catalyst and (e) 0.5 to 20 parts by weight of a compatibilizing agent, wherein the carbon-to-carbon double bond-containing rubber (a) is an ethylene-α-olefin-non-conjugated diene copolymer rubber; the thermoplastic resin (b) is a crystalline olefin resin; and the compatibilizing agent (e) is at least one member selected from the group consisting of the following compatibilizing agents (e-11), (e-12) and (e-13):

(e-11): a compatibilizing agent prepared by melt-reacting a polypropylene resin having epoxy group as an essential component with at least one member selected from the group consisting of a maleic anhydride-modified resin having a maleic anhydride group in the molecule, ethylene copolymer having a maleic anhydride group in the molecule, styrene block copolymer having a maleic anhydride group in the molecule, a hydrogenated product thereof, styrene random copolymer having a maleic anhydride group in the molecule and a hydrogenated product thereof, (e-12): a compatibilizing agent prepared by melt-reacting a polypropylene having maleic anhydride group in the molecule as an essential component with at least one epoxy-modified resin selected from the group consisting of polyethylene having an epoxy group in the molecule, ethylene copolymer having an epoxy group in the molecule, styrene block copolymer having an epoxy group in the molecule, a hydrogenated product thereof, styrene random copolymer having an epoxy group in the molecule and a hydrogenated product thereof, and (e-13): a compatibilizing agent prepared by dynamically heat-treating, in the presence of a peroxide, a blend of a polypropylene as an essential component with at least one resin selected from the group consisting of polyethylene, ethylene copolymer, styrene block copolymer, a hydrogenated product thereof, styrene random copolymer and a hydrogenated product thereof.

2. The thermoplastic elastomer composition according to claim 1, wherein the hydrosilylating catalyst (d) is a Group VIII transition metal catalyst or an organic peroxide catalyst.

3. The thermoplastic elastomer composition according to claim 1, wherein the hydrosilylating catalyst (d) is dissolved in at least one liquid component or supported on at least one solid component.

4. The thermoplastic elastomer composition according to claim 1, wherein the organosiloxane cross-linking agent (c) having at least two SiH groups in the molecule is a compound represented by the following structural formula (1), (2) or (3):

(Cyclic polysiloxane)

(Tetrahedron siloxane)

or (Linear polysiloxane)

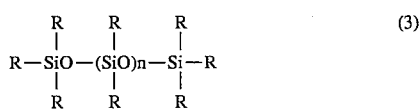

wherein m is an integer of 3 to 30, n is an integer of 0 to 200, R is a hydrogen atom, an alkyl group, an alkoxy group, an aryl group or an aryloxy group, and at least two silicon atoms each having bonded thereto at least one R being a hydrogen atom are present in the molecule.

5. The thermoplastic elastomer composition according to claim 1, wherein the compatibilizing agent (e) is added in a proportion of 0.5 to 20 parts by weight per 100 parts by weight of the total of the rubber (a) and the resin (b), said compatibilizing agent (e) being selected from the compatibilizing agents (e-11) and (e-12) in which the weight ratio of the epoxy-modified resin to the maleic anhydride-modified resin is 10:90 to 90:10 and the compatibilizing agent (e-13) in which the weight ratio of polypropylene to the at least one resin selected form the group specified in claim 1 is 10:90 to 90:10.

6. A thermoplastic elastomer composition obtained by dynamically heat-treating a mixture of (a) 100 parts by weight of a carbon-to-carbon double bond-containing rubber, (b) 5 to 300 parts by weight of a thermoplastic resin, (c) 0.5 to 30 parts by weight of an organo-siloxane crosslinking agent having at least two SiH groups in the molecule, (d) 0.001 to 20 parts by weight of a hydrosilylating catalyst, (e) 0.5 to 20 parts by weight of a compatibilizing agent, and (f) 30 to 300 parts by weight of a paraffinic oil, wherein the carbon-to-carbon double bond-containing rubber (a) is an ethylene-α-olefin-non-conjugated diene copolymer rubber; the thermoplastic resin (b) is a crystalline olefin resin; and the compatibilizing agent (e) is at least one member selected from the group consisting of the following compatibilizing agents (e-11), (e-12) and (e-13):

(e-11): a compatibilizing agent prepared by melt-reacting a polypropylene resin having epoxy group as an essential component with at least one member selected from the group consisting of a maleic anhydride-modified resin having a maleic anhydride group in the molecule, ethylene copolymer having a maleic anhydride group in the molecule, styrene block copolymer having a maleic anhydride group in the molecule, a hydrogenated product thereof, styrene random copolymer having a maleic anhydride group in the molecule and a hydrogenated product thereof, (e-12): a compatibilizing agent prepared by melt-reacting a polypropylene having maleic anhydride group in the molecule as an essential component with at least one epoxy-modified resin selected from the group consisting of polyethylene having an epoxy group in the molecule, ethylene copolymer having an epoxy group in the molecule, styrene block copolymer having an epoxy group in the molecule, a hydrogenated product thereof, styrene random copolymer having an epoxy group in the molecule and a hydrogenated product thereof, and (e-13): a compatibilizing agent prepared by dynamically heat-treating, in the presence of a peroxide, a blend of a polypropylene as an essential component with at least one resin selected from the group consisting of polyethylene, ethylene copolymer, styrene block copolymer, a hydrogenated product thereof, styrene random copolymer and a hydrogenated product thereof.

7. The thermoplastic elastomer composition according to claim 6, wherein the hydrosilylating catalyst (d) is a Group VIII transition metal catalyst or an organic peroxide catalyst.

8. The thermoplastic elastomer composition according to claim 6, wherein the hydrosilylating catalyst (d) is dissolved in at least one liquid component or supported on at least one solid component.

9. The thermoplastic elastomer composition according to claim 6, wherein the organosiloxane crosslinking agent (c) having at least two SiH groups in the molecule is a compound represented by the following structural formula (1), (2) or (3):

(Cyclic polysiloxane)

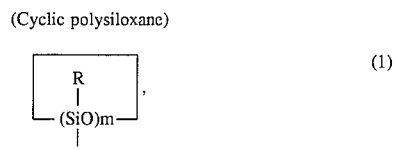

(Tetrahedron siloxane)

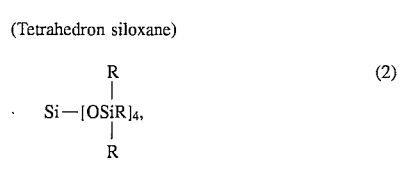

or (Linear polysiloxane)

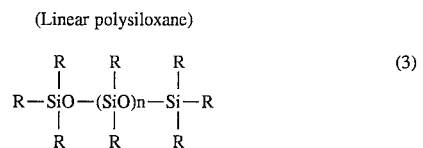

wherein m is an integer of 3 to 30, n is an integer of 0 to 200, R is a hydrogen atom, an alkyl group, an alkoxy group, an aryl group or an aryloxy group, and at least two silicon atoms each having bonded thereto at least one R being a hydrogen atom are present in the molecule.

10. The thermoplastic elastomer composition according to claim 6, wherein the compatibilizing agent (e) is added in a proportion of 0.5 to 20 parts by weight per 100 parts by weight of the total of the rubber (a) and the resin (b), said compatibilizing agent (e) being selected from the compatibilizing agents (e-11) and (e-12) in which the weight ratio of the epoxy-modified resin to the maleic anhydride-modified resin is 10:90 to 90:10 and the compatibilizing agent (e-13) in which the weight ratio of the polypropylene to the at least one resin selected form the group specified in claim 6 is 10:90 to 90:10.

* * * * *